(12) United States Patent
Wang et al.

(10) Patent No.: US 11,486,985 B2
(45) Date of Patent: Nov. 1, 2022

(54) LIDAR RECEIVER WITH ELECTRO-OPTICAL FILTER

(71) Applicant: BEIJING VOYAGER TECHNOLOGY CO., LTD., Beijing (CN)

(72) Inventors: Chao Wang, Mountain View, CA (US); Lingkai Kong, Mountain View, CA (US); Yonghong Guo, Mountain View, CA (US); Wenbin Zhu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 323 days.

(21) Appl. No.: 16/898,430

(22) Filed: Jun. 10, 2020

(65) Prior Publication Data

US 2021/0389434 A1 Dec. 16, 2021

(51) Int. Cl.
*G01S 7/48* (2006.01)
*G01S 7/487* (2006.01)
*G01S 7/4863* (2020.01)
*G01S 7/499* (2006.01)

(52) U.S. Cl.
CPC .......... *G01S 7/4876* (2013.01); *G01S 7/4863* (2013.01); *G01S 7/499* (2013.01)

(58) Field of Classification Search
CPC ...... G01S 7/4863; G01S 7/484; G01S 7/4913; G01S 7/493; G01S 7/4816; G01S 17/42; H03M 1/126; H04B 10/60; H04B 10/66
See application file for complete search history.

(56) References Cited

U.S. PATENT DOCUMENTS

2020/0326563 A1* 10/2020 Suess ............... G01S 7/4816
2021/0263198 A1* 8/2021 Zhu ................. G01S 17/894

* cited by examiner

*Primary Examiner* — Tony Ko
(74) *Attorney, Agent, or Firm* — Bayes PLLC

(57) ABSTRACT

Embodiments of the disclosure provide a receiver in an optical sensing system for receiving a light beam. The receiver includes a first polarizer configured to pass the light beam of a first polarization. The receiver further includes an electro-optical layer coated with patterned transparent electrodes. An electric field is applied to a selected area of the electro-optical layer through the patterned transparent electrodes, and the electro-optical layer changes a portion of the light beam from the first polarization to a second polarization. The receiver also includes a second polarizer configured to selectively pass the portion of the light beam of the second polarization. The receiver additionally includes a detector configured to receive the portion of the light beam output from the second polarizer.

20 Claims, 6 Drawing Sheets

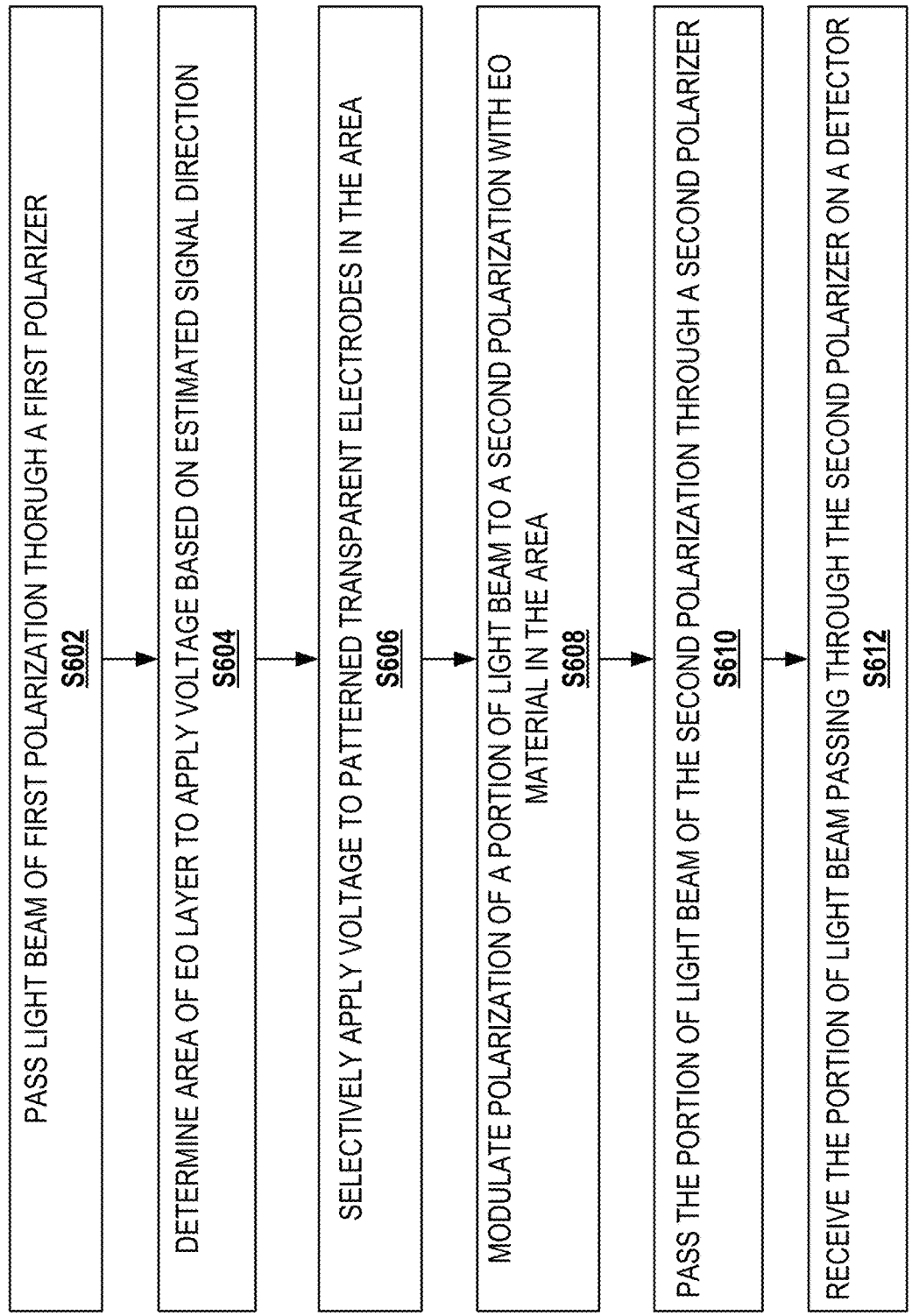

LIDAR RECEIVER WITH ELECTRO-OPTICAL FILTER

TECHNICAL FIELD

The present disclosure relates to optical sensing systems such as a light detection and ranging (LiDAR) system, and more particularly to, a receiver with an electro-optical (EO) filter for selectively receiving a portion of a light beam for such an optical sensing system.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a detector or a detector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

The pulsed laser light beams emitted by a LiDAR system are typically directed to multiple directions to cover a field of view (FOV). As a result, LiDAR system requires a receiver that can receive the returned light signals from different directions. To realize this receiving requirement, most LiDAR systems implement one of two designs: (1) a rotational mirror to deflect the return light signals so that they are all received by a static detector, or (2) using an array of detectors to receive the returned light signals within a range of directions.

The performance of the conventional detector arrays, however, is limited in two aspects. First, in the detector array, there are typically gaps between the sensor elements, which cause a signal loss. Secondly, the detector array employs a high-speed electrical switch to switch the signal among the different sensor elements. This not only increases a design complexity, but also limits the scanning speed, as the switching speed is limited by the response speed of the electrical switches. As a result, receivers with conventional detector arrays face the two-folded issues of signal loss and limited speed.

Embodiments of the disclosure improve the performance of optical sensing systems such as LiDAR systems by providing an improved receiver with an electro-optical filter.

SUMMARY

Embodiments of the disclosure provide a receiver in an optical sensing system for receiving a light beam. The receiver includes a first polarizer configured to pass the light beam of a first polarization. The receiver further includes an electro-optical layer coated with patterned transparent electrodes. An electric field is applied to a selected area of the electro-optical layer through the patterned transparent electrodes, and the electro-optical layer changes a portion of the light beam from the first polarization to a second polarization. The receiver also includes a second polarizer configured to selectively pass the portion of the light beam of the second polarization. The receiver additionally includes a detector configured to receive the portion of the light beam output from the second polarizer.

Embodiments of the disclosure also provide a method for receiving a light beam in an optical sensing system. The method includes passing the light beam of a first polarization through a first polarizer. The method further includes changing a portion of the light beam from the first polarization to a second polarization using an electro-optical layer coated with patterned transparent electrodes. An electric field is applied to a selected area of the electro-optical layer through the patterned transparent electrodes. The method also includes selectively passing the portion of the light beam of the second polarization through a second polarizer and receiving the portion of the light beam on a detector.

Embodiments of the disclosure further provide an optical sensing system. The optical sensing system includes a transmitter configured to emit a light beam to scan an object. The optical sensing system further includes a receiver configured to receive the light beam reflected by the object. The receiver includes a first polarizer configured to pass the light beam of a first polarization. The receiver further includes an electro-optical layer coated with patterned transparent electrodes. An electric field is applied to a selected area of the electro-optical layer through the patterned transparent electrodes, and the electro-optical layer changes a portion of the light beam from the first polarization to a second polarization. The receiver also includes a second polarizer configured to selectively pass the portion of the light beam of the second polarization. The receiver additionally includes a detector configured to receive the portion of the light beam output from the second polarizer.

It is to be understood that both the foregoing general description and the following detailed description are exemplary and explanatory only and are not restrictive of the invention, as claimed.

BRIEF DESCRIPTION OF THE DRAWINGS

FIG. 6 is a flow chart of an exemplary method for receiving optical signals using a LiDAR receiver with an EO filter, according to embodiments of the disclosure.

DETAILED DESCRIPTION

Figure 1:
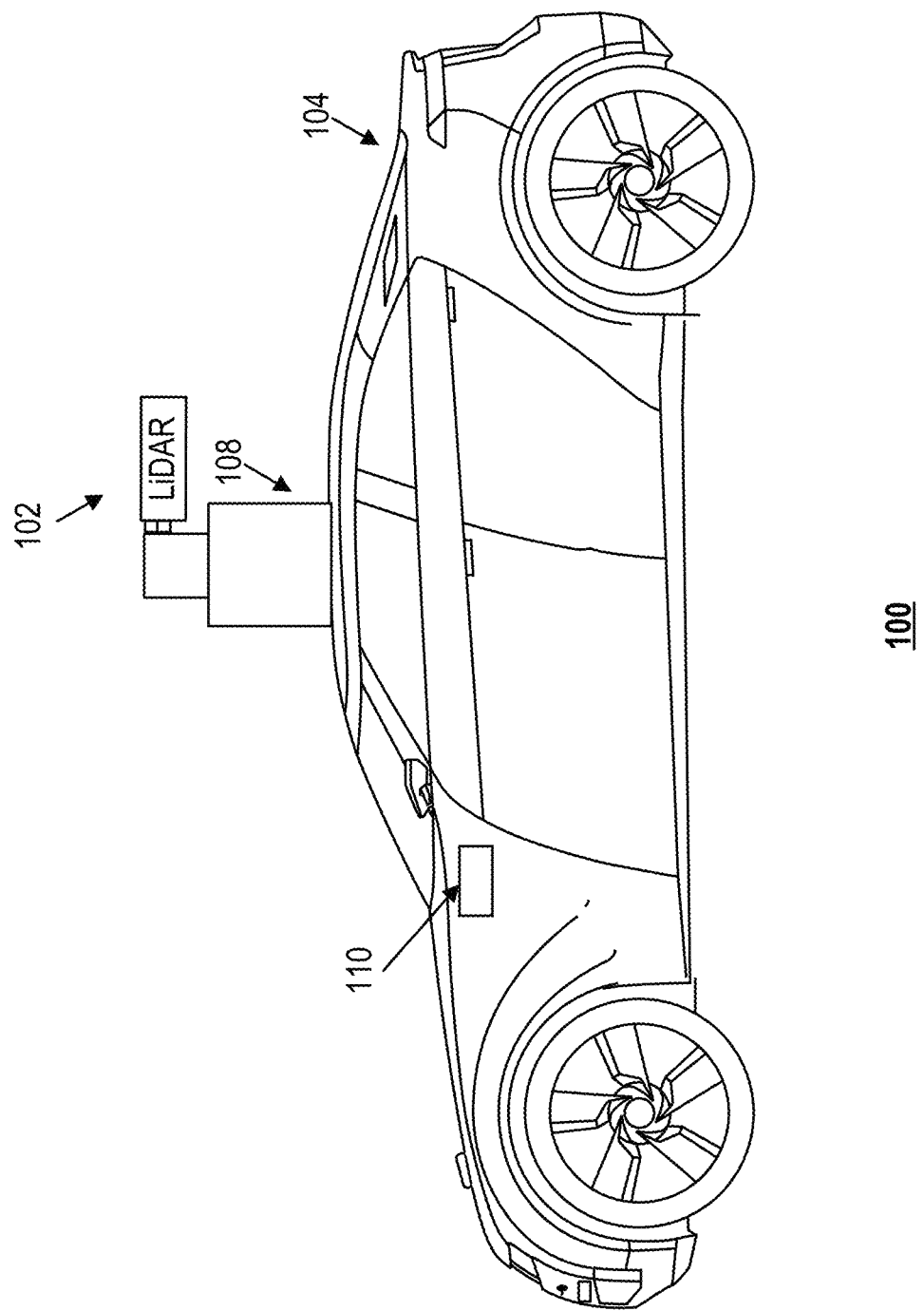
FIG. 1 illustrates a schematic diagram of an exemplary vehicle equipped with a LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for receiving light beams in an optical sensing system (e.g., a LiDAR system). For example, the optical sensing system may include a transmitter configured to emit a light beam to scan an object and a receiver configured to receive the light beam reflected by the object. In some embodiments, the receiver uses two polarizers stacked on two sides of an electro-optical layer that collectively form a signal filter to selectively pass a portion of the light beam that likely contains most of the useful information. For example, the signal filter includes a first polarizer configured to pass the light beam of a first polarization, an electro-optical layer that changes a portion of the light beam from the first polarization to a second polarization, and a second polarizer configured to selectively pass the portion of the light beam of the second polarization. In some embodiments, the electro-optical layer is coated with patterned transparent electrodes, and an electric field is applied to a selected area of the electro-optical layer through the patterned transparent electrodes. For example, to apply the electric field, the transparent electrodes in the selected area on one side of the electro-optical layer are connected with a voltage source and the transparent electrodes in the selected area on the opposite side are connected with a ground. In some embodiments, the intensity of the applied electric field is selected in order to cause a change in a refractive index in the selected area of the electro-optical layer, such that the change in the refractive index causes the portion of the light beam to change from the first polarization to the second polarization. In some embodiments, the patterned transparent electrodes can form a one-dimensional or two-dimensional array, or a nonuniform pattern. In some embodiments, the selected area is determined based on an estimated direction of an optical signal reflected by the object scanned by the transmitter of the optical sensing system. In some embodiments, the first polarizer and the second polarizer are configured as a pair of crossed polarizers oriented in two perpendicular directions. In some embodiments, the receiver further includes a detector configured to receive the portion of the light beam output from the second polarizer.

By using the disclosed EO filter, the receiver could use a one-piece detector to cover the entire receiver FOV instead of using a conventional detector array. Accordingly, the disclosed receiver reduces the signal loss experienced by the conventional detector array and eliminates the need of circuit switching among the various detector units in the detector array. Instead, it can achieve a very high speed due the the high-speed nature of the EO effect.

Embodiments of the present disclosure therefore improve the performance and simplify the design of an optical sensing system, which can be used in many applications. For example, the improved optical sensing system can be used in advanced navigation technologies, such as to aid autonomous driving or to generate high-definition maps, in which the optical sensing system can be equipped on a vehicle.

For example, FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with a pulsed laser beam and measuring the reflected pulses with a receiver. The laser beam used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

Figure 2:
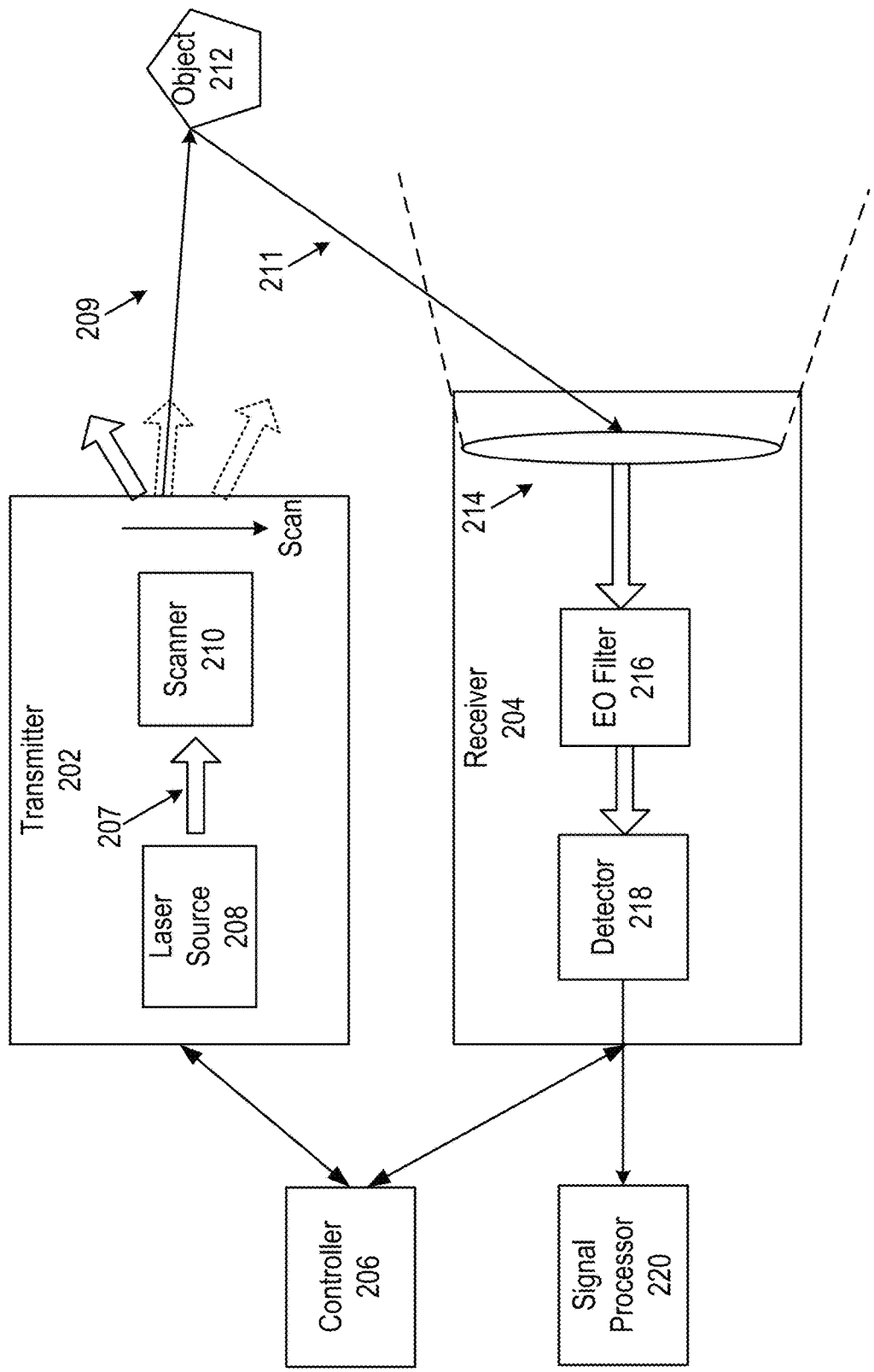
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202, a receiver 204, and a controller 206. Transmitter 202 may emit optical signals (e.g., laser light beams) along multiple directions. Transmitter 202 may include one or more laser sources 208 and a scanner 210. Transmitter 202 can sequentially emit a stream of pulsed laser beams in different directions within a scan FOV (e.g., a range in angular degrees), as illustrated in FIG. 2. Laser source 208 may be configured to provide a laser beam 207 (also referred to as "native laser beam") to scanner 210. In some embodiments of the present disclosure, laser source 208 may generate a pulsed laser beam in the ultraviolet, visible, or near infrared wavelength range.

In some embodiments of the present disclosure, laser source 208 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser source may be used as laser source 206 for emitting laser beam 207.

Scanner 210 may be configured to emit a laser beam 209 to an object 212 in a range of directions (collectively forming the FOV of transmitter 202). Object 212 may be made of a wide range of materials including, for example, non-metallic objects, rocks, rain, chemical compounds, aerosols, clouds and even single molecules. The wavelength of laser beam 209 may vary based on the composition of object 212. In some embodiments, at each time point during the scan, scanner 210 may emit laser beam 209 to object 212 in a direction within a range of scanning angles by rotating a deflector, such as a micromachined mirror assembly. In some embodiments, scanner 210 may also include optical components (e.g., lenses, mirrors) that can focus pulsed laser light into a narrow laser beam to increase the scan resolution and the range to scan object 212.

In some embodiments, receiver 204 may be configured to detect a laser beam 211 returned from object 212. Laser beam 211 may be in a different direction from beam 209. Receiver 204 can collect laser beams returned from object 212 and output electrical signals reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214, an EO filter 216, and a detector 218. Lens 214 may be configured to collect light from a respective direction in the receiver field of view (FOV) and converge the laser beam to focus before it is filtered by EO filter 216 and received on detector 218. At each time point during the scan, laser beam 211 may be collected by lens 214. Laser beam 211 may be returned from object 212 and have the same wavelength as laser beam 209.

Figure 3:
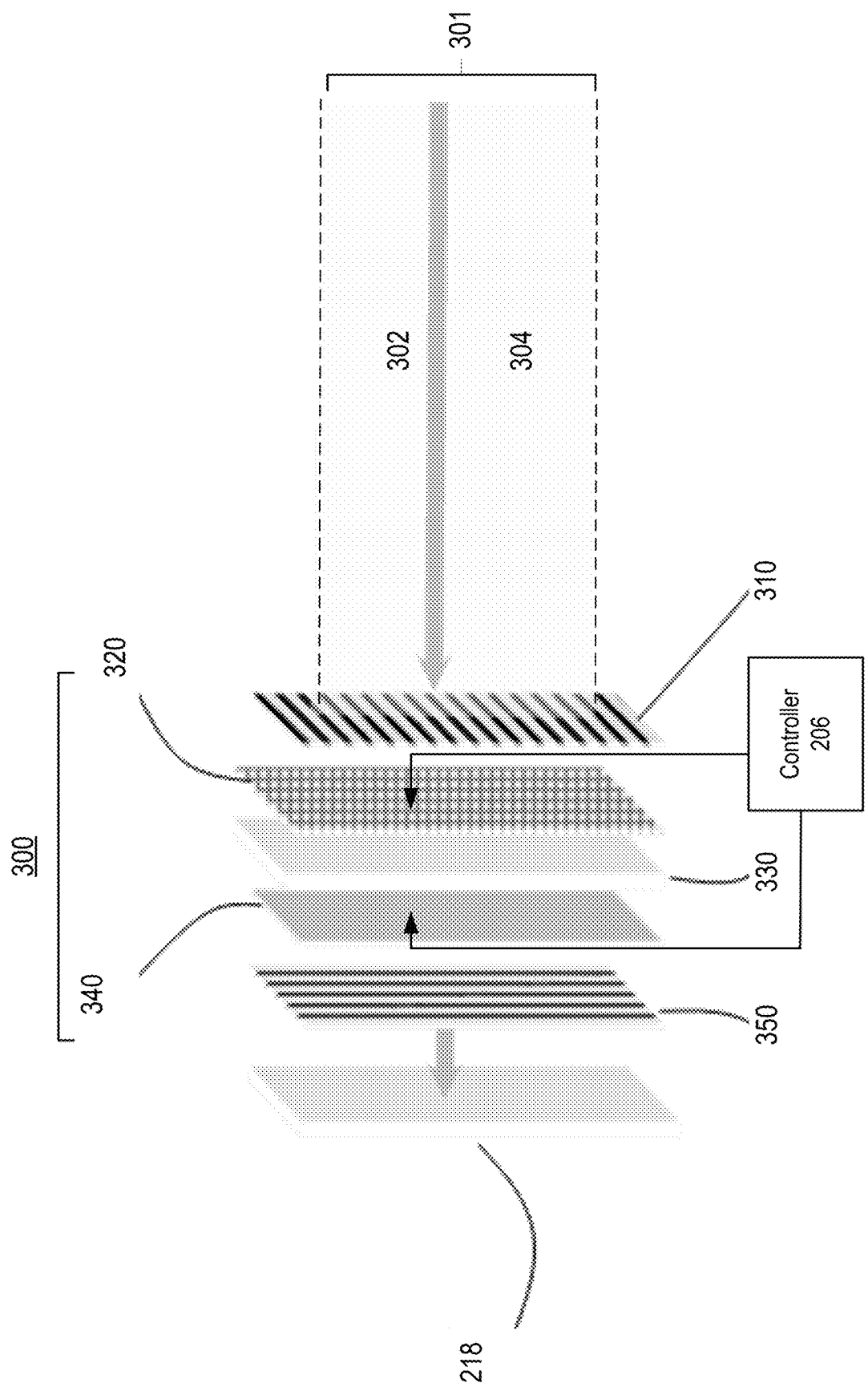
FIG. 3 illustrates a schematic diagram of an exemplary EO filter for a LiDAR receiver, according to embodiments of the disclosure.

EO filter 216 may be a multi-layer structure designed to filter the returned and converged light beam (e.g., converged laser beam 211). For example, FIG. 3 illustrates a schematic diagram of an exemplary EO filter 300 for a LiDAR receiver, according to embodiments of the disclosure. As shown in FIG. 3, EO filter 300 may be configured to filter an incoming light beam 301, which includes a signal 302 and noise 304. Although it is shown in FIG. 3 that signal 302 impinges perpendicularly on EO filter 300, it is contemplated that signal 302 within light beam 301 can be returned from the object in different directions and thus impinge on EO filter 300 at different areas. In some embodiments, EO filter 300 may be designed to allow only signal 302 to pass at the particular area signal 302 is expected to impinge on EO filter 300, blocking noise 304 to pass at other areas of EO filter 300.

In some embodiments, as shown in FIG. 3, EO filter 300 may include an EO layer 330 coated with a transparent electrode layer 320 on one side and a transparent electrode layer 340 on the opposite side. EO filter 300 may further include a pair of polarizers 310 and 350, stacking to transparent electrode layers 320 and 340 on the respective sides.

In some embodiments, polarizers 310 and 350 are optical filters that let light waves of a specific polarization pass through while blocking light waves of other polarizations. A polarizer can filter a beam of light of undefined or mixed polarization into a beam of defined polarization. In some embodiments, polarizers 310 and 350 forma pair of crossed polarizers oriented in perpendicular directions (Le the polarizing axes of polarizers 310 and 350 are orthogonal). Without any polarization between the crossed polarizers, the light beam will be blocked entirely. If a portion of the light beam is polarized between the crossed polarizers 310 and 350, the polarized portion will pass through polarizer 350 while the rest will be blocked.

In some embodiments, polarizer 310 is designed to pass entire light beam 301, including signal 302 and noise 304, if light beam 301 is of the defined polarization of polar 310. EO layer 330 coated with transparent electrode layers 320 and 340 is configured to selectively re-polarize signal 302 within light beam 301, leaving noise 304 unchanged in polarization. As a result, only the re-polarized signal 302 may pass through polarizer 350 and be received by detector 218. Noise 304 will be blocked by polarizer 350. The patterned electrodes are "transparent" so that they do not optically alter the light beam in any way.

In some embodiments, the selective polarization of signal 302 may be achieved by predicting the particular area signal 302 will impinge on EO layer 330 and modulating the polarization of signal 302 at that particular area. In some embodiments, signal 302 is re-polarized through electro-optical modulation. The EO material in EO layer 330 responds to an electric field applied across it and develops a refractive index modulation within the material, which in turn causes a phase change in the light beam traveling through the EO material. Because the phase change depends on the polarization, EO modulation can also be used to modulate the polarization of a light wave.

In some embodiments, the refractive index of EO layer 330 at the selected area can be modulated to be a function of the electric field applied to it. For example, when an electric field is applied across an EO crystal (or a portion of the EO crystal), the refractive index of the EO crystal may change (e.g., be modulated) as a function of the intensity of the electric field, which can be expressed in the following form:

$$n = f(E).$$

n is the refractive index of the EO material, E is the applied electric field. For Pockels EO crystals, such as ZnSe, ZnTe, potassium dihydrogen phosphate (KDP), LiNbO$_3$, BaTiO$_3$, etc., the refractive index change (Δn) is linearly proportional to the magnitude of the electric field (E). For Kerr EO crystals, such as ammonium dihydrogen phosphate (ADP), SrTiO$_3$, lead zirconate titanate (PLZT), potassium tantalum niobate (KTN), etc., the refractive index change (Δn) is proportional to the square of the magnitude of the electric field (E$^2$).

In some embodiments, EO layer 330 may be made of liquid crystal, the most common EO material. In various embodiments, EO layer 330 may be made of one or more of ZnSe, ZnTe, KDP, LiNbO$_3$, BaTiO$_3$, LiTaO$_3$, KTiOPO$_4$, lithium niobate (LN), ammonium dihydrogen phosphate (ADP), SrTiO$_3$, PLZT, KTN, and cadmium telluride (CdTe).

In some embodiments, transparent electrode layers 320 and 340 may each include multiple transparent electrodes arranged in a predetermined pattern. For example, the patterned transparent electrodes may form a one-dimensional or a two-dimensional array. As another example, the patterned transparent electrodes may form a nonuniform pattern. A voltage potential may be applied across EO layer 330 through certain transparent electrodes of transparent electrode layers 320 and 340 in the selected area, to form the electric field across EO layer 330. By adjusting the voltage potential applied, the refractive index of the EO material is modulated and thus the polarization of light wave traveling through the EO material is changed accordingly.

Figure 4:
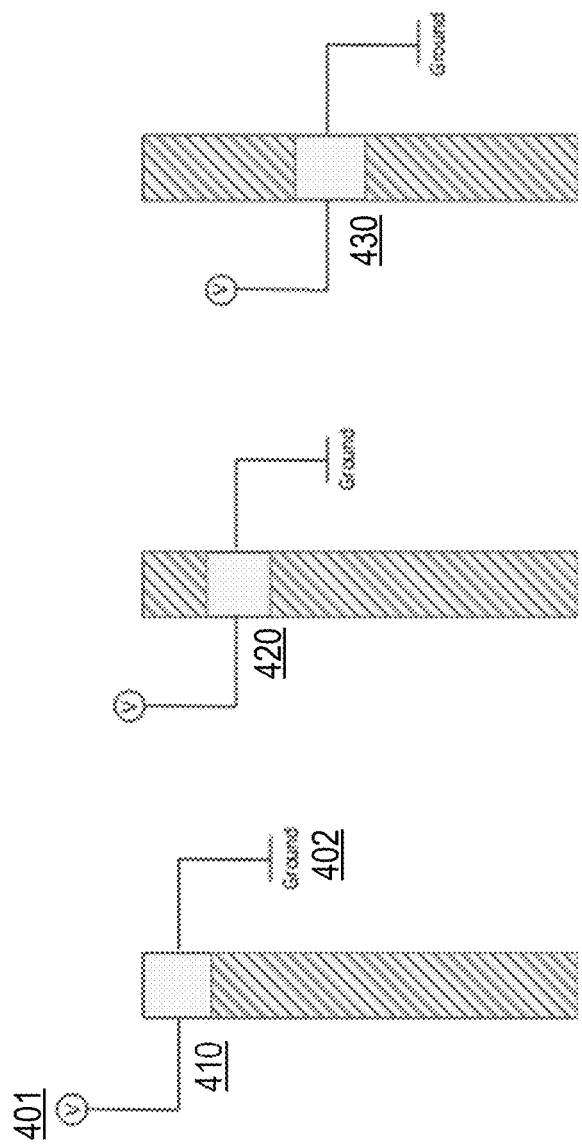
FIG. 4 illustrates application of a voltage potential on an EO layer, according to embodiments of the disclosure.

For example, FIG. 4 illustrates application of a voltage potential on an EO layer, according to embodiments of the disclosure. As shown in FIG. 4, electrodes on one side of the EO layer may be connected to a voltage source 401, and the corresponding electrodes on the opposite side of the EO layer may be connected to a ground 402, to form a voltage potential V across the EO layer. Depending on the incoming direction of signal 302, electrodes of a selected area (e.g., area 410, 420 or 430) on the EO layer may be used for applying the voltage potential.

Figure 5:
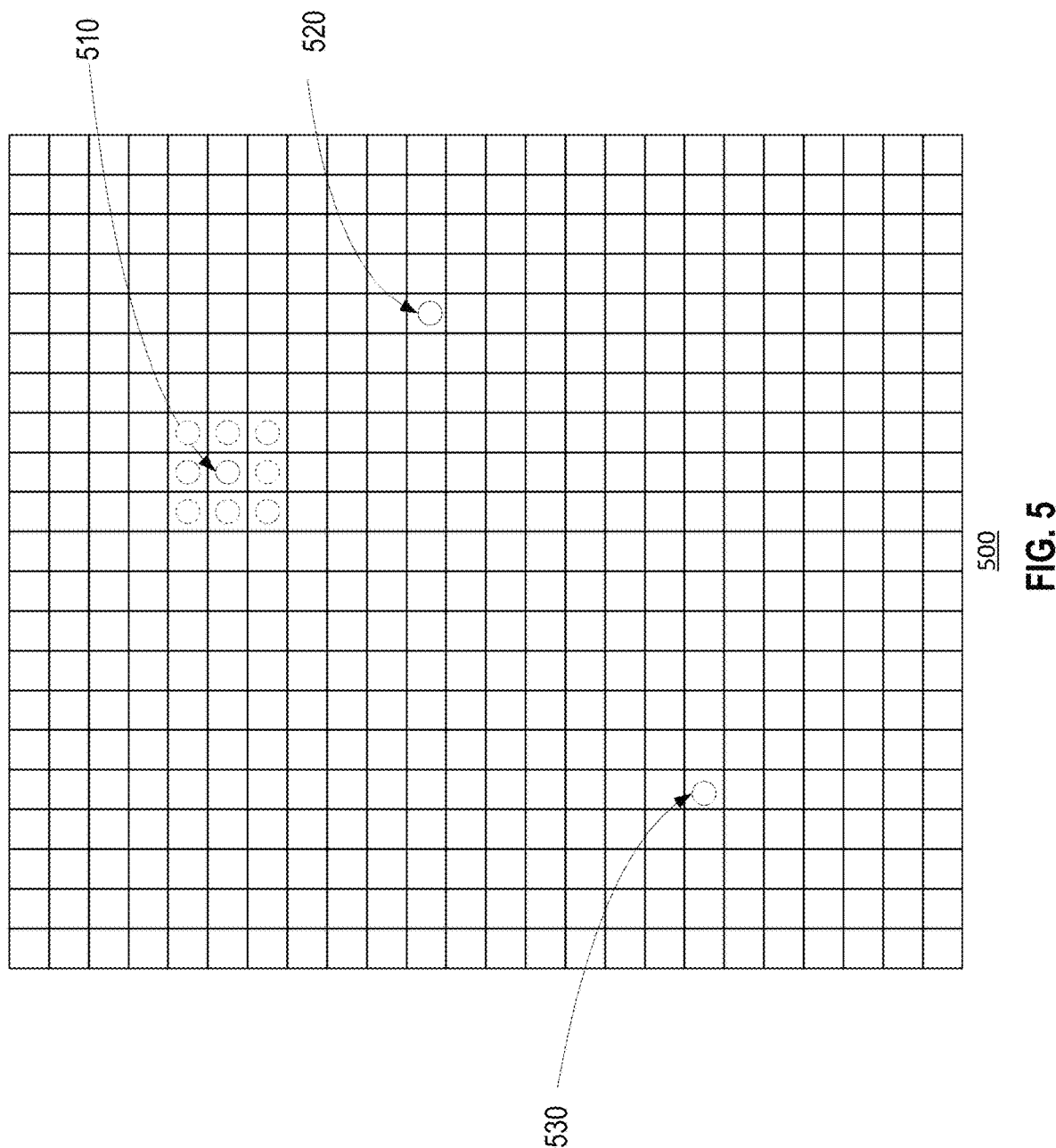
FIG. 5 illustrates a section view of an exemplary 2D patterned transparent electrodes coated on an EO layer, according to embodiments of the disclosure.

FIG. 5 illustrates a section view of an exemplary 2D patterned transparent electrodes 500 coated on an EO layer, according to embodiments of the disclosure. In some embodiments, 2D patterned transparent electrodes 500 may be used for 2D LiDAR scans. In some embodiments, 2D patterned transparent electrodes 500 may form a m by n array, where m and n are integer numbers selected according to the size of transparent electrode layers 320 and 340, as well as the desired spatial resolution for applying EO modulation. In some embodiments, 2D patterned transparent electrodes 500 can provide a very high resolution as the electrode pattern can be fabricated in a very small size. Depending on the different incoming directions of signal 302, electrodes 510, 520, or 530 in different areas of the coated electrode layer can be selected for applying the voltage potential. In some embodiments, multiple electrodes in a selected area may be used, e.g., electrode 510 and the other 8 electrodes surrounding it as shown in FIG. 5.

In some embodiments, the electrode pattern may also be nonuniform to provide nonuniform resolution (not shown). For example, electrodes may be denser near the center of each of transparent electrode layer 320 and 340 and sparser towards the sides and corners. The electrodes in the sparser regions may be larger in size to each cover a larger area. In some embodiments, the nonuniform design of the electrode pattern may be determined based on the predicted directions of incoming signal 302. For example, denser electrodes are disposed in areas that more likely receive signal 302 to provide a higher resolution.

After passing through EO filter 300, a portion of light beam 301 (e.g., signal 302) may be output and received by detector 218. Returning to FIG. 2, detector 218 may be configured to detect the portion of light beam (e.g., containing signal 302) output by EO filter 216. In some embodiments, detector 218 may be a single piece of sensor large enough to detect light signals returned in the entire receiver FOV. Because only a portion of the light beam will pass EO filter 218 in a selected area, the filtered light beam impinges on a small area on detector 218. In some embodiments, detector 218 may convert the light signal into an electrical signal (e.g., a current or a voltage signal). The electrical signal may be generated when photons are absorbed in a photodiode included in detector 218. In some embodiments, detector 218 may include a PIN detector, an avalanche photodiode (APD) detector, a single photon avalanche diode (SPAD) detector, a silicon photo multiplier (SiPM) detector, or the like.

The electrical signal may be transmitted to a data processing unit, e.g., signal processor 220 of LiDAR system 102, to be processed and analyzed. For example, signal processor 220 may determine the distance of object 212 from LiDAR system 102 based on the electrical signal and data of laser beam 209. In some embodiments, signal processor 220 may be part of controller 206.

Controller 206 may be configured to control transmitter 202 and/or receiver 204 to perform detection/sensing operations. Controller 206 may include components (not shown) such as a communication interface, a processor, a memory, and a storage for performing various control functions. In some embodiments, controller 206 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operation of EO filter 216 (or EO filter 300 in FIG. 3).

In some embodiments, controller 206 may determine the area on EO layer 330 to perform the EO modulation and then control the connection of transparent electrodes of transparent electrode layers 320 and 340 in that selected area to apply an electric field across EO layer 330. In some embodiments, controller 206 may further determine an intensity of that applied electric field in order to cause a change in a refractive index in the selected area of EO layer 330, such that the change in the refractive index causes a desired polarization in a portion of the light beam impinging on the area. For example, because different EO materials respond to the electric field differently, controller 206 may determine the intensity of the electric field based on the type of the material(s) used in EO layer 330 and its respective EO effect. Based on the intensity of the electric field, controller 206 may further calculate the voltage potential V (e.g., as shown in FIG. 4) to be applied to the electrodes.

FIG. 6 is a flow chart of an exemplary method 600 for receiving optical signals using a LiDAR receiver with an EO filter, according to embodiments of the disclosure. In some embodiments, method 600 may be performed by various components of LiDAR receiver 204, including, e.g., EO filter 300, detector 218, and controller 206 shown in FIG. 3. In some embodiments, method 600 may include steps S602-612. It is to be appreciated that some of the steps may be optional. Further, some of the steps may be performed simultaneously, or in a different order than shown in FIG. 6.

In step S602, a light beam returned from a scanned object is received by receiver 204. In some embodiments, the light beam may be converged by lens 214 of receiver 204 before going through EO filter 216, as shown in FIG. 2. Within EO filter 216, the light beam may be filtered by a first polarizer and a portion (or the entirety) of the light beam of a first polarization may pass through. For example, as shown in FIG. 3, light beam 301 (including signal 302 and noise 304) of the first polarization may pass through polarizer 310.

In step S604, controller 206 may determine an area of EO layer 330 to apply a voltage potential based on an estimated direction of the signal. In some embodiments, controller 206 may estimate the incoming direction of the light signal (e.g., signal 302) at each time point according to the scan angle of scanner 210, and/or deflection by lens 214. For example, controller 206 may receive scanning parameters used by transmitter 202. In some embodiments, controller 206 may be the same controller that determine the scanning parameters and therefore have the parameters saved in its memory/storage.

In some embodiments, controller 206 may further determine the voltage potential to be applied to the selected area. Controller 206 may first determine a change in the refractive index that could cause a sufficient phase delay in the portion of the light beam to change its polarization from the first polarization to the second polarization. In some embodiments, controller 206 may then determine an intensity of the electric field to be applied across EO layer 330 in order to cause that requisite change in the refractive index, according to the EO effect of the material(s) that make EO layer 330. For example, the refractive index may change as a function of the intensity of the electric field and the particular formula of that function depends on the EO crystal used. For instance, for Pockels EO crystals, the function is linear while for Kerr EO crystals, the function is nonlinear. In some embodiments, controller 206 may then determine the voltage potential V according to the intensity of the electric field. In some alternative embodiments, the voltage potential may be predetermined and programed into controller 206 during manufacturing of the LiDAR receiver.

In step S606, controller 206 may selectively apply the voltage potential to patterned transparent electrodes in the selected area. In some embodiments, controller 206 may connect the electrodes in transparent electrode layer 320 to a ground and the corresponding electrodes in transparent electrode layer 340 to a voltage source supplying the voltage potential. For example, controller 206 may apply the voltage potential V to electrodes in area 410, 420 or 430 as shown in FIG. 4, or apply the voltage potential to electrodes 510, 520, or 530 as shown in FIG. 5. The connection and disconnection of electrodes to the voltage source/ground may be implemented through electronic switches controllable by controller 206.

In step S608, EO layer 330, with the voltage potential applied to the selected area, may modulate the polarization of a portion of the light beam impinging on it. In some embodiments, because the area is selected as where signal 302 is estimated to impinge on EO layer 330, the polarization of signal 302 is modulated (e.g., from the first polarization to the second polarization), leaving the polarization of the rest of the light beam (e.g., noise 304) unchanged.

In step S610, the selectively re-polarized light beam is then filtered by polarizer 350. Because polarizer 350 is designed to only pass light waves of the second polarization, only the portion of the light beam (e.g., signal 302) re-polarized by EO layer 330 will pass through polarizer 350. In step S612, the portion of the light beam passing through polarizer 350 is received by detector 218.

Therefore, by using a pair of crossed polarizers (e.g., polarizers 310 and 350) and an EO layer in between (e.g., EO layer 330 coated with transparent electrode layers 320 and 340) to re-polarize a desired portion of the light beam returned from the object, method 600 effectively filters the light beam such that only the desired portion (e.g., signal 302) is received by the detector. Method 600 may be repeated until a LiDAR scan to cover the entire FOV is complete. For example, to each scan angle, controller 206 may select a different area of EO layer in step S604 to apply the voltage potential in step S606, such that EO layer 330 modulates the polarization of the desired signal portion in step S608 for it to pass through polarizer 350 in step S610.

Although the disclosure is made using a LiDAR system as an example, the disclosed embodiments may be adapted and implemented to other types of optical sensing systems that use receivers to receive optical signals not limited to laser light beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A receiver in an optical sensing system for receiving a light beam, the receiver comprising:
    a first polarizer configured to pass the light beam of a first polarization;
    an electro-optical layer coated with patterned transparent electrodes, wherein an electric field is applied to a selected area of the electro-optical layer through the patterned transparent electrodes, wherein the electro-optical layer changes a portion of the light beam from the first polarization to a second polarization;
    a second polarizer configured to selectively pass the portion of the light beam of the second polarization; and
    a detector configured to receive the portion of the light beam output from the second polarizer.

2. The receiver of claim 1, wherein the optical sensing system is a Light Detection and Ranging (LiDAR) system and the light beam is a laser beam.

3. The receiver of claim 1, wherein a first side of the electro-optical layer is coated with a first set of patterned transparent electrodes, and a second side of the electro-optical layer opposite to the first side is coated with a second set of patterned transparent electrodes.

4. The receiver of claim 3, wherein the transparent electrodes in the selected area on the first side are connected with a voltage source and the transparent electrodes in the selected area on the second side are connected with a ground.

5. The receiver of claim 1, wherein the first polarizer and the second polarizer are configured as a pair of crossed polarizers oriented in two perpendicular directions.

6. The receiver of claim 1, further comprising a controller, configured to:
    determine the selected area based on an estimated direction of an optical signal reflected by an object scanned by the optical sensing system.

7. The receiver of claim 6, wherein the controller is further configured to:
    determine an intensity of the applied electric field in order to cause a change in a refractive index in the selected area of the electro-optical layer, wherein the change in the refractive index causes the portion of the light beam to change from the first polarization to the second polarization.

8. The receiver of claim 1, wherein the electro-optical layer is made of liquid crystal.

9. The receiver of claim 1, wherein the electro-optical layer is made of a Pockels material or a Kerr material.

10. The receiver of claim 1, wherein the patterned transparent electrodes form a nonuniform pattern.

11. The receiver of claim 1, wherein the patterned transparent electrodes form a two-dimensional array.

12. A method for receiving a light beam in an optical sensing system, comprising:
    passing the light beam of a first polarization through a first polarizer;
    changing a portion of the light beam from the first polarization to a second polarization using an electro-optical layer coated with patterned transparent electrodes, wherein an electric field is applied to a selected area of the electro-optical layer through the patterned transparent electrodes;

selectively passing the portion of the light beam of the second polarization through a second polarizer; and receiving the portion of the light beam on a detector.

13. The method of claim 12, wherein a first side of the electro-optical layer is coated with a first set of patterned transparent electrodes, and a second side of the electro-optical layer opposite to the first side is coated with a second set of patterned transparent electrodes, wherein the transparent electrodes in the selected area on the first side are connected with a voltage source and the transparent electrodes in the selected area on the second side are connected with a ground.

14. The method of claim 12, further comprising:

determining the selected area based on an estimated direction of an optical signal reflected by an object scanned by the optical sensing system.

15. The method of claim 12, further comprising:

determining an intensity of the applied electric field in order to cause a change in a refractive index in the selected area of the electro-optical layer, wherein the change in the refractive index causes the portion of the light beam to change from the first polarization to the second polarization.

16. The method of claim 12, wherein the patterned transparent electrodes form a two-dimensional array.

17. An optical sensing system, comprising:

a transmitter configured to emit a light beam to scan an object; and a receiver configured to receive the light beam reflected by the object, the receiver comprising:

a first polarizer configured to pass the light beam of a first polarization;

an electro-optical layer coated with patterned transparent electrodes, wherein an electric field is applied to a selected area of the electro-optical layer through the patterned transparent electrodes, wherein the electro-optical layer changes a portion of the light beam from the first polarization to a second polarization;

a second polarizer configured to selectively pass the portion of the light beam of the second polarization; and a detector configured to receive the portion of the light beam output from the second polarizer.

18. The optical sensing system of claim 17, wherein a first side of the electro-optical layer is coated with a first set of patterned transparent electrodes, and a second side of the electro-optical layer opposite to the first side is coated with a second set of patterned transparent electrodes, wherein the transparent electrodes in the selected area on the first side are connected with a voltage source and the transparent electrodes in the selected area on the second side are connected with a ground.

19. The optical sensing system of claim 17, wherein the receiver further comprises a controller, configured to:

determine the selected area based on an estimated direction of an optical signal reflected by an object scanned by the optical sensing system; and determine an intensity of the applied electric field in order to cause a change in a refractive index in the selected area of the electro-optical layer, wherein the change in the refractive index causes the portion of the light beam to change from the first polarization to the second polarization.

20. The optical sensing system of claim 17, wherein the electro-optical layer is made of liquid crystal, a Pockels material, or a Kerr material.

* * * * *